United States Patent [19]

Tanaka

[11] Patent Number: 5,856,957
[45] Date of Patent: Jan. 5, 1999

[54] MAGNETIC FIELD APPLYING DEVICE

[75] Inventor: Toshihisa Tanaka, Yokohama, Japan

[73] Assignee: Nikon Corporation, Tokyo, Japan

[21] Appl. No.: 939,091

[22] Filed: Sep. 26, 1997

[30] Foreign Application Priority Data

Oct. 4, 1996 [JP] Japan .................................... 8-263965

[51] Int. Cl.⁶ .................................................. G11B 11/10
[52] U.S. Cl. .......................... 369/13; 369/32; 369/44.12; 369/112; 369/110
[58] Field of Search ................................ 369/13, 32, 112, 369/110, 44.12, 44.11; 360/114, 59; 310/316, 323, 328

[56] References Cited

U.S. PATENT DOCUMENTS

| 4,743,788 | 5/1988 | Takagi et al. | 310/316 |
| 5,239,524 | 8/1993 | Sato et al. | 369/13 |
| 5,600,613 | 2/1997 | Matsumoto et al. | 369/32 |

FOREIGN PATENT DOCUMENTS

| 7-087763 | 3/1995 | Japan . |
| 7-264881 | 10/1995 | Japan . |
| 7-264884 | 10/1995 | Japan . |

*Primary Examiner*—Tod R. Swann
*Assistant Examiner*—Kim-Kwok Chu
*Attorney, Agent, or Firm*—Oliff & Berridge, PLC

[57] ABSTRACT

A compact magnetic field applying device rotates and holds a magnetic field generating member using a small-scale, light-weight vibration actuator. A permanent magnet applies a bias magnetic field on a magnetized information recording area of a magnetooptical disk, and is driven by a vibration actuator. When voltage is applied to a piezoelectric element of the vibration actuator, an annular elastic member generates a travelling wave due to a bending vibration in the perimeter direction of a groove on the elastic member. Because the elastic member and a moving member provided on the permanent magnet are pressed into contact by a coil spring, the permanent magnet rotates. When voltage is not applied to the piezoelectric element, because the elastic member and the moving member are pressed into contact, the permanent magnet is held in a specified rotational position.

20 Claims, 4 Drawing Sheets

MAGNETIC FIELD APPLYING DEVICE

INCORPORATION BY REFERENCE

The disclosure of the following priority application is herein incorporated by reference: Japanese Patent Application No. 8-263965 filed Oct. 4, 1996.

The disclosures of the following additional publications and patents are herein incorporated by reference:

Japanese Laid-Open Patent Application No. 7-87763;
Japanese Laid-Open Patent Application No. 7-264881;
Japanese Laid-Open Patent Application No. 7-264884;
U.S. Pat. No. 4,743,788; and
U.S. Pat. No. 5,239,524.

BACKGROUND OF THE INVENTION

1. Field of Invention

The present invention relates to a magnetic field applying device for use in recording and deleting information by applying a magnetic field to an information recording medium such as, for example, a magnetooptical disk having a magnetized information recording area.

2. Description of Related Art

FIG. 3 is an exploded, perspective view of one example of a conventional magnetic field applying device. FIG. 4 is a cross-sectional view of the conventional magnetic field applying device.

Referring to FIG. 4, a magnetooptical disk 1 is an information recording medium formed of a magnetooptical recording material, in which the direction of magnetization is uniform, that is applied as a film on a substrate 11.

Magnetooptical disk 1 consists of a disk-shaped substrate 11 made of, for example, amorphous polyolefin or epoxy, a conductor layer 12 made of $SiN_x$, AlN, or the like, provided on one side of the substrate 11, a rare earth-transient metallic amorphous thin film recording film layer (magnetooptical recording material) 13 made of a crystal such as magnetic garnet and magnetic ferrite, for example, TbFeCo, GbTbFeCo, and the like, provided on the surface of the conductor layer 12, and a protective film layer 14 made of oxides such as $SiO_2$ and SiO, provided on the surface of the recording film layer 13. A rotating mechanism (not illustrated) having a central hole for attachment to a drive is formed on magnetooptical disk 1.

A permanent magnet 2 generates a bias magnetic field in the direction and in the reverse direction of the magnetization on the magnetized recording film layer 13 of magnetooptical disk 1. The permanent magnet 2 is part of the write-head for recording information on the disk 1.

As shown in FIG. 3, permanent magnet 2 has rotating shafts 2a and 2b that protrude from both ends in its longitudinal direction. Permanent magnet 2 is a round columnar or cylindrical permanent magnet that is divided magnetically in its diameter direction into a semi-columnar N polar region and a semi-columnar S polar region (see FIG. 4).

Shaft couplers 3a and 3b support permanent magnet 2 so that it can rotate freely. The inner diameter portions of shaft couplers 3a and 3b support rotating shafts 2a and 2b, respectively, to rotate freely. Shaft couplers 3a and 3b are inserted into the inner diameter portion of flanges 4a and 4b of a holder 4, to be explained later. Shaft couplers 3a and 3b are radial shaft couplers for supporting the load of the rotating shafts 2a and 2b, and act in a direction perpendicular to the axial direction of magnet 2.

Holder 4 houses the permanent magnet 2 and shaft couplers 3a and 3b. Holder 4 also supports hollow core coils 5, 6 and iron core coil 7, to be explained later. Together with the permanent magnet 2, holder 4 is the yoke for forming the magnetic field. Holder 4 is preferably made of a non-magnetic material, such as, for example, aluminum or copper, or the like. Holder 4 consists of flanges 4a and 4b for housing shaft couplers 3a and 3b, respectively, and a cylindrical holder main body 4c linking flanges 4a and 4b for housing permanent magnet 2 so that magnet 2 is located inside holder 4. Holder 4 is preferably attached by an attaching member (not illustrated) opposite the case body of the information recording and reproducing device so as to sandwich magnetooptical disk 1, or is attached close to an object lens (collecting lens) that collects the laser light emitted from a laser light emitting device (not illustrated).

Hollow core coils 5 and 6 are auxiliary coils for providing rotational torque, together with main coil 7, to be explained later, to permanent magnet 2. Hollow core coils 5 and 6 are fixed substantially 180° apart from each other on the periphery of holder main body 4c by fixing means, such as, for example, an adhesive.

Iron core coil 7 can be actuated so that a state exists in which permanent magnet 2 and iron core coil 7 are attracted to each other by generating a magnetic pole that is different from a magnetic pole of a portion of permanent magnet 2 located adjacent to coil 7. Coil 7 also can be actuated so that a state exists in which permanent magnet 2 and iron core coil 7 repel each other by generating a magnetic pole that is the same as a magnetic pole of a portion of permanent magnet 2 located adjacent to coil 7.

Iron core coil 7 consists of a main coil 71 and an iron core 72. Iron core coil 7 is fixed, for example, by adhesive to holder main body 4c offset substantially 90° with respect to hollow core coils 5 and 6. In other words, coil 7 is located substantially perpendicular to the direction in which hollow core coils 5 and 6 are disposed.

Next, the operation of the conventional magnetic field applying device is explained with respect to a recording operation, a reproduction operation, and a deleting operation.

By supplying electric current to iron core coil 7, iron core coil 7 is attracted to the S pole of permanent magnet 2, forming a stable magnetic state. As a result, the S pole of permanent magnet 2 and the iron core coil 7 are positioned opposite each other, and the N pole of permanent magnet 2 is positioned opposite the surface of magnetooptical disk 1.

Recording film layer 14 of magnetooptical disk 1 is magnetized in advance in a direction perpendicular to the film surface of the recording film layer 14. When the N pole of permanent magnet 2 opposes the film surface of recording film layer 14, a line of magnetic force (the dashed line in the drawing) is formed in the vicinity of the permanent magnet 2 and the magnetooptical disk 1 by the bias magnetic field $H_B$ of permanent magnet 2.

Laser light B emitted from a laser light emitting device (not illustrated) is collected by collecting lens L, and then a light spot is formed on part of recording film layer 14 having the bias magnetic field $H_B$ applied thereto. As a result, the part on which the light spot is formed is heated and, as shown in FIG. 4, a magnetic bubble $M_B$, which is a reversed magnetization relative to the direction of magnetization of the layer 14 in advance, is formed on this part of recording film layer 14.

By the above operation, information can be recorded on recording film layer 14 based on the presence or absence of magnetic bubbles $M_B$.

When reproducing information recorded on magnetooptical disk 1, laser light B having a weaker intensity than the laser light B used during recording is radiated on recording film layer 14 to form a light spot on the recording film layer 14. The polarization of the reflected light of the radiated laser light B is rotated by a Kerr effect according to the direction of magnetization of the recording film layer 14 from which the light is reflected. By passing the reflected light through a linear polarizer, the polarization of this light, and hence the presence or absence of magnetic bubbles $M_B$ (i.e., data) can be detected. By the above operation, information recorded on recording film layer 14 can be reproduced.

When deleting information recorded on recording film layer 14, it is necessary to restore the reversed magnetic bubble $M_B$ on recording film layer 14 to its original direction of magnetization by again reversing the magnetization direction of layer 14 at the location of the magnetic bubble $M_B$. Therefore, in order to apply a bias magnetic field $H_B$ to the reversed magnetic bubble $M_B$ in a reversed direction to that used during recording, it is necessary to reverse permanent magnet 2 substantially 180° from the state shown in FIG. 4.

In the state shown in FIG. 4, when electric current flows to hollow core coils 5 and 6, respectively, an N pole is formed in hollow core coil 5 and an S pole is formed in hollow core coil 6. Accordingly, hollow core coil 5 and permanent magnet 2, and hollow core coil 6 and permanent magnet 2, enter a state of repulsion. As a result, permanent magnet 2 rotates, receiving a rotational torque FA in the direction of the arrow in the drawing.

When electric current flows to main coil 71 substantially at the same time as the supply of electricity to hollow core coils 5 and 6, an S pole is formed in iron core coil 72. Accordingly, iron core coil 7 and the opposing portion of permanent magnet 2 enter a state of repulsion, and permanent magnet 2 receives a repelling torque FB in the direction of the arrow in the drawing. As a result, permanent magnet 2 rotates, for example, at 10–20 mm/s, in the direction of the arrows FA and FB in the drawing in relation to holder 4 by a composite torque (FA+FB) of rotational torque FA and repelling torque FB.

When permanent magnet 2 rotates in the direction of the arrow (FA+FB) in the drawing and rotates in excess of 180° from the state shown in FIG. 4, the N pole of permanent magnet 2 is positioned opposite iron core coil 7. As a result, permanent magnet 2 and iron core coil 7 enter a state of attraction, and permanent magnet 2 rotates up to and is aligned to the magnetic polar position of iron core 72. Permanent magnet 2 and iron core coil 7 enter a state of attraction by maintaining the electrified state of main coil 71, and permanent magnet 2 has its S pole held in a state opposite the surface of magnetooptical disk 1.

The S pole of permanent magnet 2 applies a bias magnetic field $H_B$ to recording film layer 14 having a reversed magnetic bubble $M_B$ formed in relation to the adjacent area of recording film layer 14. Also, a line of magnetic force is formed in the vicinity of permanent magnet 2 and magnetooptical disk 1 in a direction opposite the line of magnetic force (dashed line in the drawing) shown in FIG. 4.

Laser light B, emitted from a laser light emitting device (not illustrated) and collected by collecting lens L, forms a light spot on a part of recording film layer 14 having a bias magnetic field $H_B$ applied opposite to that applied during recording. As a result, the part having the light spot formed thereon is heated, and because a magnetization (magnetic bubble $M_B$) being in the same direction as the direction of magnetization of adjacent portions is formed on the part of recording film layer 14, the direction of magnetization prior to recording is restored. By the above operation, information recorded on recording film layer 14 is deleted.

For more details on magnetooptical recording disks and methods of recording, reproducing and deleting data therefrom, see, for example, U.S. Pat. No. 5,239,524, the disclosure of which is herein incorporated by reference.

The conventional magnetic field applying device described above places permanent magnet 2 and iron core coil 7 into a state of attraction and holds the N pole or S pole of permanent magnet 2 in a state opposed to the surface of magnetooptical disk 1 by maintaining the electrified state of main coil 71. Therefore, electric power is consumed by main coil 71 in order to hold permanent magnet 2 in position.

Additionally, when there is a magnetic body, such as, for example, an iron strip, or the like, in the vicinity of permanent magnet 2, because permanent magnet 2 receives a force of attraction from the magnetic body, control of rotation and holding of the permanent magnet 2 by the hollow core coils 5, 6 and iron core coil 7 is difficult.

Furthermore, because the conventional magnetic field applying device holds hollow core coils 5 and 6 using holder 4, the entirety of the device can not be made compact.

SUMMARY OF THE INVENTION

It is an object of the present invention to provide a compact magnetic field applying device that can hold a magnetic field generating member (e.g., a magnet) in position without consuming electric power.

It is another object of the invention to provide a magnetic field applying device that can perform rotational control and holding of the magnetic field generating member without being effected by a magnetic body located in the vicinity thereof.

According to an embodiment of the invention, a vibration actuator (e.g., a piezoelectric (ultrasonic) motor) is used to drive a magnetic field generator such as a permanent magnet. The magnetic field applying device includes a magnetic field generating member that generates a bias magnetic field in first and second opposite directions, and a vibration actuator that drives the magnetic field generating member so as to switch the direction of the bias magnetic field generated by the magnetic field generating member. The magnetic field applying device can be used for recording and/or deleting information by applying a bias magnetic field to an information recording medium having a magnetized information recording area.

The magnetic field generating member can include a columnar permanent magnet having a driven part on one longitudinal end thereof, and holding members for holding the permanent magnet so that it is free to rotate around its longitudinal axis. The vibration actuator can include an annular elastic member having a driving part pressed into contact with the driven part of the permanent magnet. The vibration actuator also can include an electromechanical conversion element provided on the elastic member for generating a travelling wave to the driving part.

The permanent magnet can be placed in the vicinity of the information recording medium, which is disk-shaped, so that the longitudinal axis of the permanent magnet extends in the radial direction of the information recording medium.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
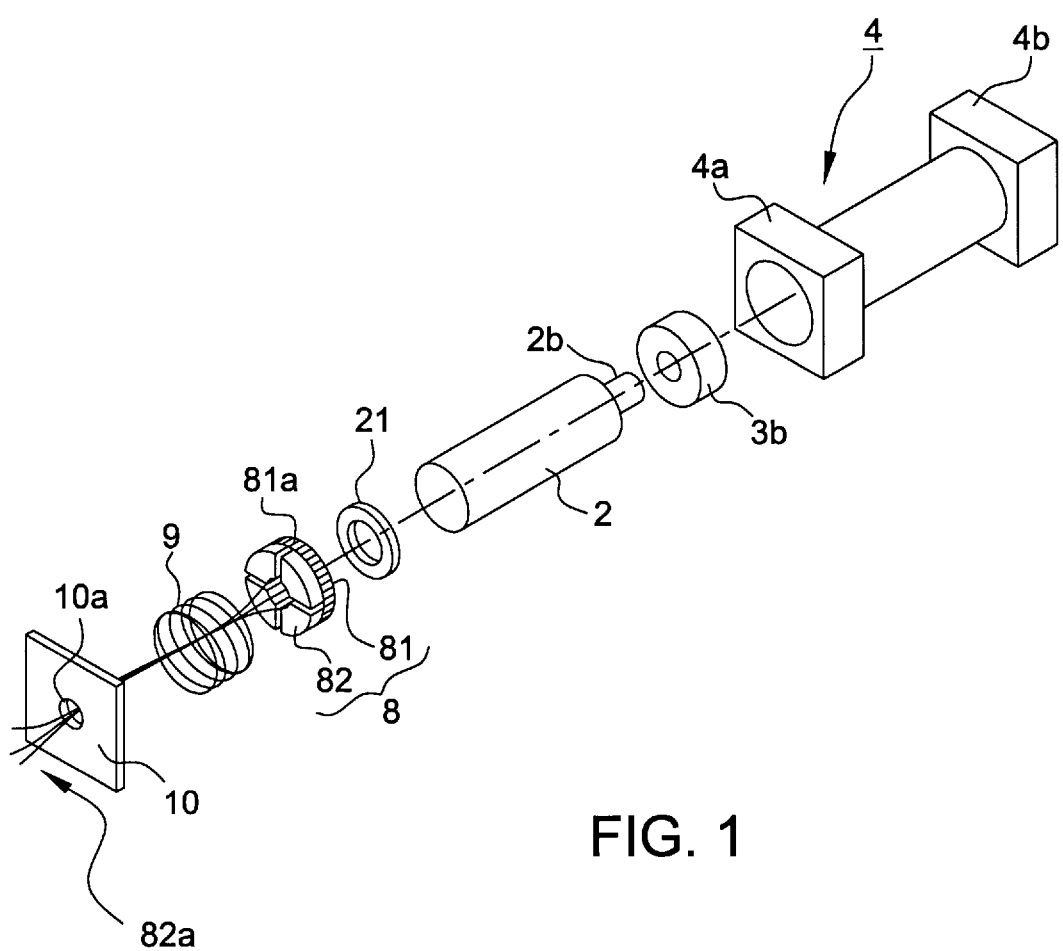
FIG. 1 is an exploded, perspective view of a magnetic field applying device according to a first embodiment of the present invention.

An embodiment of the present invention is explained in further detail below referring to the drawings.

Figure 3:
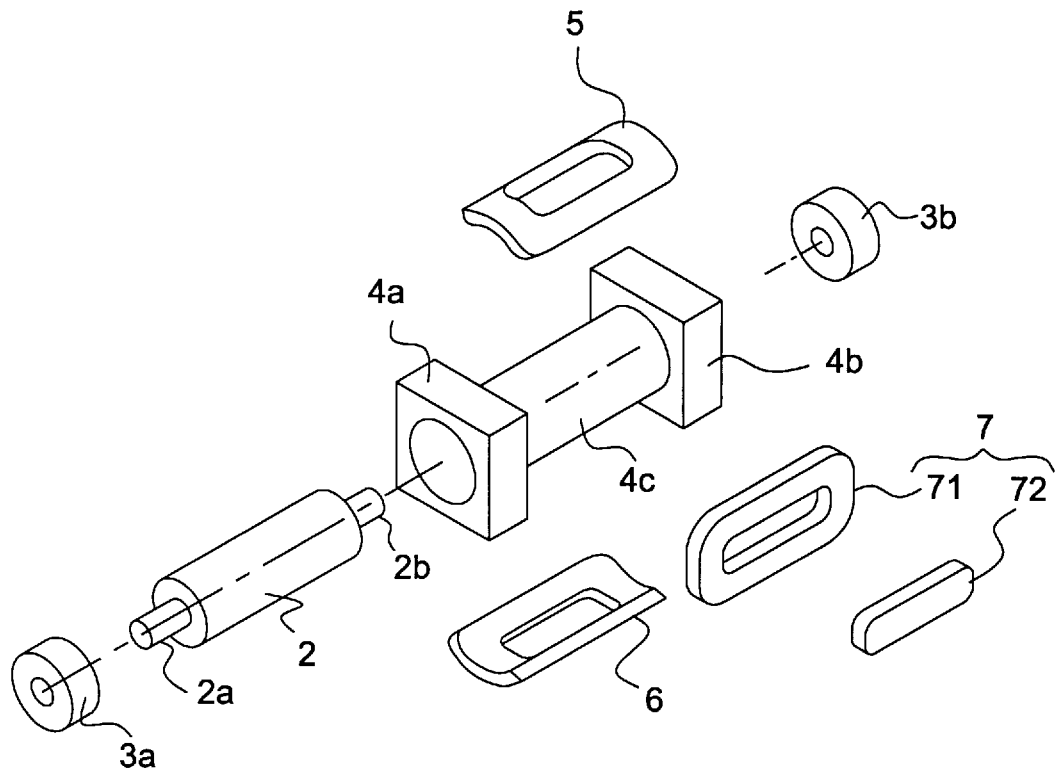
FIG. 3 is an exploded, perspective view of a conventional magnetic field applying device.
Figure 4:
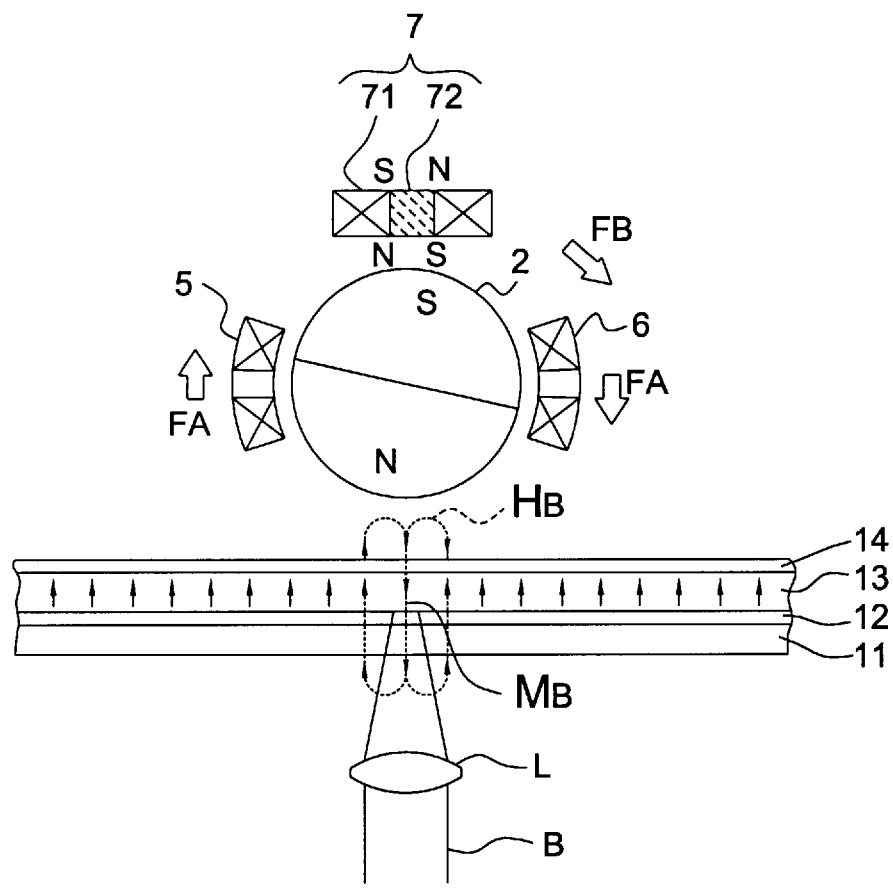
FIG. 4 is a cross-sectional view of the conventional magnetic field applying device.

In the following explanation, elements identical to elements of the magnetic field applying device explained with respect to FIGS. 3 and 4 are explained assigning the identical symbols thereto. Accordingly, a detailed explanation of those elements is omitted.

Figure 2:
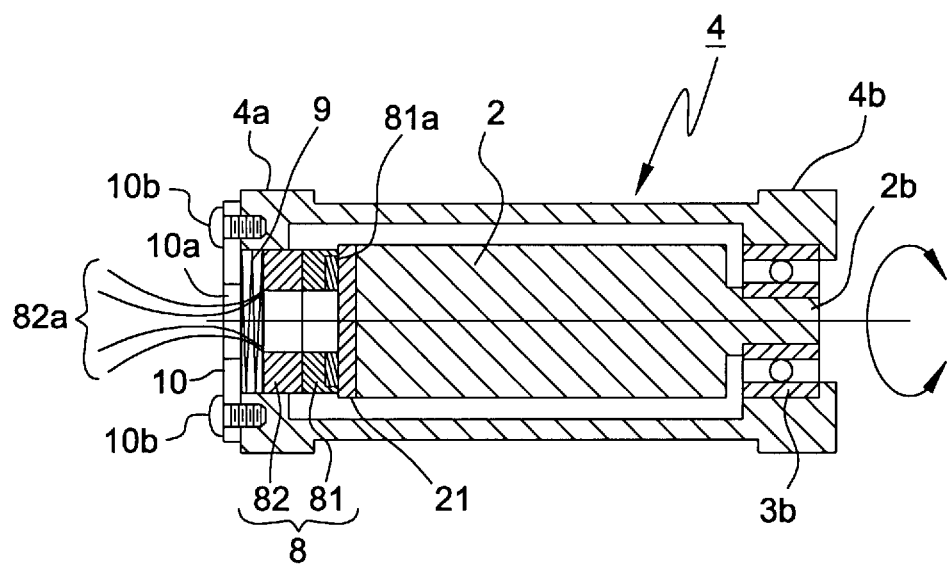
FIG. 2 is a cross-sectional view of the FIG. 1 device.

As shown in FIG. 1 and FIG. 2, permanent magnet 2 in the embodiment of the present invention includes a rotation shaft 2b projecting from one of its longitudinal ends. A moving member 21 is attached to the other longitudinal end of magnet 2 and contacts elastic member 81 of vibration actuator 8, to be explained later. Rotation shaft 2b is supported on the inner perimeter of flange 4b of holder 4 so as to rotate freely (about the longitudinal axis of magnet 2) via shaft coupler 3b. Vibration actuator 8 is inserted in the inner perimeter of flange 4a of holder 4.

Vibration actuator 8 is an ultrasonic motor of the travelling wave type. Vibration actuator 8 frictionally drives moving member 21 by generating a progressive vibrational wave (referred to below as a travelling wave).

As shown in FIG. 1 and FIG. 2, vibration actuator 8 includes elastic member 81 and piezoelectric element 82 affixed to the surface on one side of the elastic member 81. The construction of such ultrasonic motors is disclosed, e.g., in Japanese Laid-Open Patent Appl. No. 7-87763, Japanese Laid-Open Patent Appl. No. 7-264881, Japanese Laid-Open Patent Appl. No. 7-264884, and U.S. Pat. No. 4,743,788, the disclosures of which are herein incorporated by reference. Accordingly, the structure of vibration actuator 8 is explained briefly below.

Elastic member 81 is an annular member that generates driving force using piezoelectric element 82, to be explained later, to excite a travelling wave according to drive signals supplied thereto.

Piezoelectric element 82 is bonded to elastic member 81 using an adhesive, or the like, having electrical conductivity. A plurality of grooves 81a also are formed on the surface of elastic member 81 that does not have piezoelectric element 82 affixed thereto. This is done to increase the amplitude of the travelling wave. The surface of the grooves 81a that contact the moving member 21 becomes the driving part for generating the driving force. Elastic member 81 is preferably made from a metal such as stainless steel having magnetic property, stainless steel not having magnetic property, aluminum, and the like.

Piezoelectric element 82 is an electromechanical conversion element that functions to convert electrical energy into mechanical energy, and is excited by the supply of drive signals thereto.

An A-phase electrode and a B-phase electrode, not illustrated, are provided on piezoelectric element 82. Between the A-phase electrode and the B-phase electrode, a pickup and GND (earth), not illustrated, are provided. Drive lines 82a are respectively connected to the A-phase electrode, the B-phase electrode, the pickup, and the GND of piezoelectric element 82. The drive lines 82a are led out of holder 4 through drive line output hole 10a of restraining plate 10, to be explained later.

Moving member 21 is annular and is pressed into contact with elastic member 81 and is frictionally driven by the travelling wave. A surface of moving member 21 is pressed into contact with the end surface of elastic member 81 that contains the grooves 81a. Moving member 21 is fixedly attached to permanent magnet 2 by bonding to one longitudinal end surface of permanent magnet 2.

Moving member 21 has sufficient mechanical strength to propagate the generated driving force to permanent magnet 2. Also, the contact surface of moving member 21, which is pressed into contact with grooves 81a, must have a high-precision degree of levelness (flatness). Therefore, a metallic material such as aluminum, iron, stainless steel, and the like, is used to form moving member 21.

Pressing member 9 presses the elastic member 81 against the moving member 21. Pressing member 9 is housed in the inner perimeter of flange 4a of holder 4, and is, for example, a coil spring, plate spring, and the like.

Restraining plate 10 maintains pressing member 9 inside flange 4a of holder 4, and restrains it from popping out therefrom. Restraining plate 10 is fixed to the longitudinal end surface of holder 4 by fixing screws 10b. As mentioned earlier, a drive line output hole 10a for leading out drive lines 82a is formed in plate 10.

Next, the operation of the magnetic field applying device according to this embodiment of the present invention is explained. Alternating current voltage is applied to the A-phase electrode of piezoelectric element 82 by an oscillator (not illustrated) via drive line 82a. Alternating current voltage phase-shifted by $\pi/2$ is supplied to the B-phase electrode. As a result, piezoelectric element 82 generates a travelling wave by producing a bending vibration in the peripheral direction of the grooves 81a of elastic member 81. Because grooves 81a and moving member 21 are pressed into contact with each other by pressing member 9, the travelling wave is propagated as frictional driving force to moving member 21 by grooves 81a.

The direction of progression of the travelling wave due to grooves 81a can be defined by controlling the phase variation of the applied voltage to be positive or negative.

Permanent magnet 2 rotates around its longitudinal axis due to the frictional driving force propagated to moving member 21. By inverting permanent magnet 2 by approximately 180°, it can be positioned with its N pole or its S pole opposite to the surface of magnetooptical disk 1.

When alternating current voltage is not supplied to piezoelectric element 82, because grooves 81a and moving member 21 are pressed into contact by pressing member 9, the N pole or S pole of permanent magnet 2 is held in a state opposite to the surface of magnetooptical disk 1.

As explained above, because the magnetic field applying device according to this embodiment of the invention switches the direction of the bias magnetic field from permanent magnet 2 using a vibration actuator 8, the entirety of the magnetic field applying device can be made compact by using a small-scale, light-weight vibration actuator 8. In particular, because hollow core coils 5 and 6 are not installed as in the conventional device, the magnetic field applying device can be made small-scale and light-weight.

Additionally, because the N pole or S pole of permanent magnet 2 can be held in a state opposite to the surface of magnetooptical disk 1 without maintaining an electrified state thereof, a reduction of electrical power consumption results.

Permanent magnet 2 of the magnetic field applying device according to the described embodiment of the invention is preferably placed in the vicinity of the surface of magnetooptical disk 1 such that its longitudinal axis extends in the radial direction of magnetooptical disk 1. By such placement, a bias magnetic field can be applied uniformly to magnetooptical disk 1 by only rotating magnetooptical disk 1, i.e., without driving permanent magnet 2 in its axial direction.

Also, because a magnetic field applying device such as the conventional device rotates permanent magnet 2 using hollow core coils 5, 6 and iron core coil 7, the permanent magnet was restricted to a round columnar shape. However, because permanent magnet 2 of the magnetic field applying device according to the invention is rotated by vibration actuator 8, it may also be a polygonal columnar body and is not limited to being a round columnar permanent magnet.

Furthermore, although the described vibration actuator was an ultrasonic motor, vibration actuators utilizing vibrations outside the ultrasonic region can also be used with the invention.

Electromechanical conversion elements other than piezoelectric conversion elements can be used with the invention. For example, an electrostriction element or a magnetostriction element, or the like, capable of converting electrical energy into mechanical energy, may also be used.

Additionally, the vibration actuator could be of the type that generates a linear movement, e.g., instead of a rotational movement. The linear movement could be converted to a rotational movement (e.g., by cams and/or gears) or the linear movement could be used to linearly drive the magnetic field generator, as detailed below.

The magnetic field generator need not be a permanent magnet. Additionally, while the illustrated magnetic field generator changed the magnetic bias generated to the magnetooptical disk by rotationally changing its orientation, its orientation could be changed in different ways, e.g., by a linear movement. For example, the magnetic field generator could be linearly driven to change the portion of it that is located adjacent to the magnetooptical disk (e.g., from an N-pole portion to an S-pole portion).

Additionally, the invention can be used in applications other than the described application of applying a magnetic field to an information recording medium.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. A magnetic field applying device for recording and/or deleting information on an information recording medium by applying a bias magnetic field to the information recording medium, the information recording medium having an information recording area that is magnetized in a predetermined direction, the device comprising:

a magnetic field generator that selectively generates the bias magnetic field in the predetermined direction of magnetization and in a reverse direction that is the reverse of the predetermined direction of magnetization; and a vibration actuator that drives the magnetic field generator to switch the direction of the bias magnetic field generated by the magnetic field generator.

2. The device of claim 1, wherein:

the magnetic field generator includes:

a columnar permanent magnet having a driven part on a longitudinal end thereof, and a holding member that holds the permanent magnet so as to be free to rotate around a longitudinal axis thereof; and the vibration actuator includes:

an elastic member having a driving part pressed into contact with the driven part, and an electromechanical converter provided on the elastic member to generate a travelling wave in the driving part.

3. The device of claim 2, wherein the electromechanical converter is a piezoelectric element.

4. The device of claim 1, wherein the vibration actuator is an electromechanical converter.

5. The device of claim 4, wherein the electromechanical converter is a piezoelectric element.

6. The device of claim 4, wherein the electromechanical converter rotationally drives the magnetic field generator.

7. The device of claim 1, wherein the vibration actuator rotationally drives the magnetic field generator.

8. The device of claim 1, wherein the magnetic field generator includes a magnetized body having a first part that is magnetized to a first polarity and a second part that is magnetized to a second polarity different from the first polarity, and wherein the vibration actuator drives the magnetized body so as to change an orientation of the magnetized body in order to switch the direction of the bias magnetic field generated by the magnetic field generator.

9. The device of claim 8, wherein the second polarity is opposite from the first polarity.

10. The device of claim 8, wherein the vibration actuator rotationally drives the magnetized body to change the orientation of the magnetized body.

11. The device of claim 8, wherein the magnetized body is a permanently magnetized body.

12. A magnetic field applying device comprising:

a magnetized body having a first part that is magnetized to a first polarity and a second part that is magnetized to a second polarity different from the first polarity, the magnetized body being movable between a first orientation in which the first part is placed in a predetermined position to apply a magnetic bias having the first polarity, and a second orientation in which the second part is placed in the predetermined position to apply a magnetic bias having the second polarity; and a vibration actuator coupled to the magnetized body to drive the magnetized body between the first orientation and the second orientation.

13. The device of claim 12, wherein the vibration actuator is an electromechanical converter.

14. The device of claim 13, wherein the electromechanical converter is a piezoelectric element.

15. The device of claim 13, wherein the electromechanical converter rotationally drives the magnetized body.

16. The device of claim 12, wherein the second polarity is opposite from the first polarity.

17. The device of claim 12, wherein the vibration actuator rotationally drives the magnetized body to change the orientation of the magnetized body.

18. The device of claim 12, wherein the magnetized body is a permanently magnetized body.

19. A magnetic field applying device comprising:

magnetic bias means for selectively applying a first magnetic bias having a first polarity and a second magnetic bias having a second polarity different from the first polarity;

means for converting electrical energy into mechanical vibrations; and means for coupling the mechanical vibrations to the magnetic bias means so that the mechanical vibrations change an orientation of the magnetic bias means to switch between application of the first magnetic bias and the second magnetic bias.

20. The device of claim 19, wherein the means for converting generates mechanical vibrations that produce a traveling wave that rotationally drives the magnetic bias means to change the orientation of the magnetic bias means.

* * * * *